Aug. 3, 1965  L. R. BROWN  3,198,383
MARKING SPREADER
Filed July 15, 1963

INVENTOR
LAURENCE R. BROWN

United States Patent Office 3,198,383
Patented Aug. 3, 1965

3,198,383
MARKING SPREADER
Laurence R. Brown, 8103 Bardu Court, Springfield, Va.
Filed July 15, 1963, Ser. No. 294,840
3 Claims. (Cl. 222—1)

This invention relates to means and methods for spreading fertilizer or grass seed and more particularly to the art of applying uniformly powdered fertilizer, or the like, to lawns.

When applying powdered fertilizer it is difficult to spread it evenly without overlaps and voids, since thin layers are almost indistinguishable upon application.

Accordingly it is desirable to provide a line marker easily distinguishable so that each row may be laid down contiguous to the preceding row.

Accordingly it is an object of this invention to provide improved methods and apparatus for distributing uniform contiguous rows of powdered fertilizer.

Another object of the invention is to provide an improved fertilizer spreader.

A further object of the invention is to provide improved line marking means and methods for applying fertilizer or the like.

In accordance with a mechanical embodiment of the invention therefore a mechanical spreader has a bin which is compartmented or divided into a smaller end compartment for receiving and dispersing finely powdered limestone or bone meal, while the main compartment receives powdered fertilizer. In this manner a distinguishable line is formed at the edge of each row.

The invention with attendant methods and further features and advantages is described with particularity by reference to the accompanying drawing, wherein.

It has been found that finely powdered limestone or bone meal leaves a plainly visible path on either wet or dry grass of various textures when spread by a mechanical fertilizer spreader, in contrast to fertilizer materials such as 5–10–5, etc. Accordingly it is possible to use this concept in a fertilizer spreader to produce a line marker so that contiguous rows may be spread in accordance with the following procedural steps. First the storage bin of the spreader is divided either by partitioning or loading, such as by inserting a paper spacer, so that one end region contains powdered limestone like marking material while the rest of the bin contains fertilizer or seed, which should be uniformly spread. In general the limestone is finer ground, and therefore not only is more visible per se but in addition flows more freely to make a readily visible marker path along the path over which the spreader is manipulated.

Figure 1:
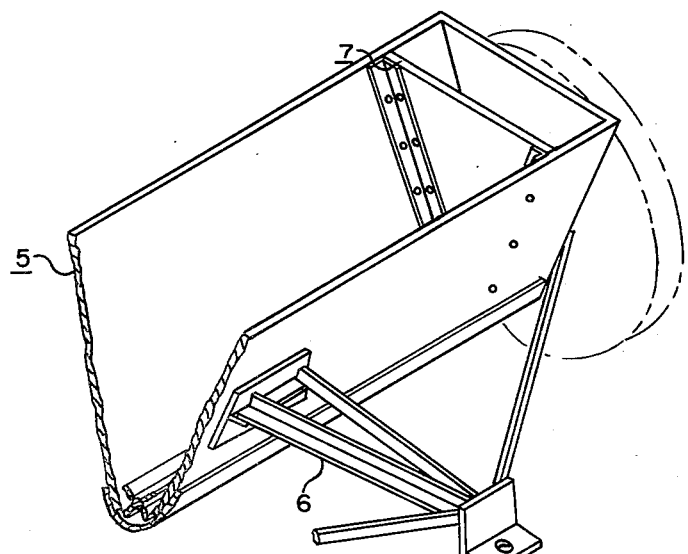
FIGURE 1 is a cut away perspective view of a fertilizer spreader incorporating the invention.
Figure 2:
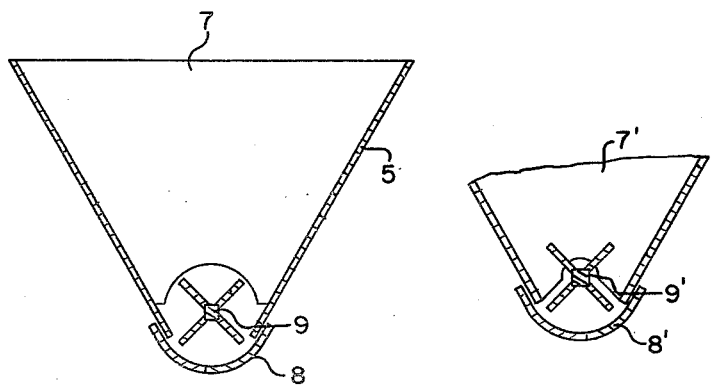
FIGURE 2 is an end section view of the spreader bin.

While this may be done without special compartments, it is preferred to provide a spreader 5 as shown in FIGURE 1, with a separating panel 7 secured in the fertilizer bin near one end. This permits the rotor 9 to dispense both fertilizer and marking powder normally through the adjustable aperture plate 8 on either side of panel 7. Thus a standard spreader may be used by simply placing a friction fitting cardboard panel in place, or a bolted addition added as in FIGURE 1. In manufacture such a panel may be welded in position.

Figure 3:
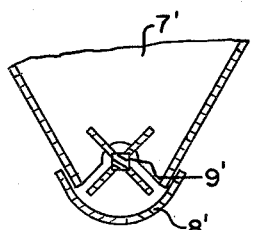
FIGURE 3 is a fragmental view of a modification of the spreader.

When using the spreader, the marker material is poured in the end bin and is thus substantially isolated for discharge at the edge of the row. However some leakage and mixing of charges may occur at the rotor 9, so that if desired a more restricted panel can be formed and passed through notched rotor blades as shown in FIGURE 3. This makes a sharper marker line. The compartment may be filled with the fertilizer when marking is not otherwise desired.

It is evident therefore that the means and methods provided by this invention will permit uniform spreading of fertilizer so that burning in overlap areas and unfertilized gaps are not left in lawns, etc. Those features of novelty descriptive of the invention are defined with particularity in the following claims.

I claim:

1. In a spreader for dispensing materials such as fertilizer comprising, a movable dispensing spreader having a storage bin mounted over the shaft between a pair of wheels and extending substantially therebetween dispensing means including agitating means disposed along the length of said shaft for engaging materials in said bin and dispensing them evenly over a row width disposed between said wheels as the spreader is moved, the improvement providing means for marking the limit of the row width to dispense materials evenly over a surface in contiguous rows comprising a panel inserted in said bin at one end thereof to form a small compartment at the end of said storage bin which communicates with said agitating means at the end of said shaft to dispense only at the edge of said row width any marking materials placed in said small compartment alongside the material placed in said storage bin.

2. The improvement in mobile dispensers for marking the edge of dispensed rows having a bin for receiving materials to be dispensed, an agitator operated during movement of said dispenser for feeding materials from said bin evenly across a row of predetermined width, comprising a panel in said bin dividing it into major and minor compartments, the minor compartment communicating with said agitator only in the region at the edge of said row width to thereby dispense marking substance placed in said minor compartment alongside said materials to mark the edge of the row.

3. The method of marking lines while spreading powdered fertilizer or the like from a mobile mechanical spreader having a bin extending across a row of predetermined width and agitator dispensing means feeding materials from said bin into said row as the spreader is moved, comprising in combination, loading said bin with marking substance only near one end thereof to define the edge of said row, and loading the rest of said bin with the fertilizer so that movement of the spreader causes the dispensing means to dispense the marking substance alongside the fertilizer to mark the edge of said row.

References Cited by the Examiner

UNITED STATES PATENTS

| 128,888 | 7/72 | Jones et al. | 111—26 |
| 211,270 | 1/79 | Sims et al. | 222—139 |
| 679,438 | 7/01 | Starkey | 222—177 X |
| 1,107,044 | 8/14 | De Kay | 222—139 |
| 1,226,108 | 5/17 | Olney | 222—139 X |
| 2,520,680 | 8/50 | Hamilton | 111—26 |
| 3,035,740 | 5/62 | Burch | 222—139 |
| 3,114,481 | 12/63 | West | 222—138 |

RAPHAEL M. LUPO, *Primary Examiner.*

Disclaimer 3,198,383.—*Laurence R. Brown*, Springfield, Va. MARKING SPREADER. Patent dated Aug. 3, 1965. Disclaimer filed Apr. 10, 1970, by the inventor.

Hereby enters this disclaimer to claim 3 of said patent.

[*Official Gazette August 18, 1970.*]